United States Patent [19]

Russo et al.

[11] Patent Number: 4,741,476
[45] Date of Patent: May 3, 1988

[54] DIGITAL ELECTRONIC THERMOSTAT WITH CORRECTION FOR TRIAC SELF HEATING

[75] Inventors: James Russo; Michael R. Levine; Victor Rigotti, all of Ann Arbor; Nicholas Skogler, Ypsilant, all of Mich.

[73] Assignee: Honeywell Inc., Minneapolis, Minn.

[21] Appl. No.: 70,437

[22] Filed: Jul. 7, 1987

[51] Int. Cl.[4] .......................... H01L 31/00; F23N 5/20
[52] U.S. Cl. .................................... 236/46 R; 165/26; 374/114; 307/310
[58] Field of Search .................. 236/46 R, 78 R, 1 R, 236/78 B; 165/26, 12; 307/310; 374/114

[56] References Cited

U.S. PATENT DOCUMENTS

| | | |
|---|---|---|
| 4,206,872 | 6/1980 | Levine .......................... 236/46 R |
| 4,294,115 | 10/1981 | Labus ............................ 374/114 |
| 4,677,282 | 6/1987 | Walsh ............................ 219/497 X |

Primary Examiner—William E. Wayner
Attorney, Agent, or Firm—Krass and Young

[57] ABSTRACT

The present invention is an electronic thermostat having correction for the self heating due to the semiconductor switching device used to switch a temperature modifying apparatus on. This invention includes a semiconductor power switching device disposed on an upper portion of a vertically oriented circuit board, a first thermistor disposed on the circuit board at a lower portion thereof remote from the semiconductor power switching device, and a second thermistor disposed on the circuit board at a portion intermediate between the semiconductor power switching device and the first thermistor. A corrected ambient temperature is generated from the temperature indicated by the first thermistor and the difference in indicated temperature between the second thermistor and the first thermistor. The state of the semiconductor power switching device is then controlled based upon the relationship between the corrected temperature and a desired temperature.

10 Claims, 6 Drawing Sheets

DIGITAL ELECTRONIC THERMOSTAT WITH CORRECTION FOR TRIAC SELF HEATING

FIELD OF THE INVENTION

The technical field of the invention is that of digital electronic thermostats and particularly to such thermostats which employ correction in the measured ambient temperature for the self heating caused by the semiconductor switching element employed.

BACKGROUND OF THE INVENTION

The technical field of the invention is that of digital electronic thermostats. Digital electronic thermostats are known in the art as exemplified by U.S. Pat. No. 4,206,872 entitled "Electronic Thermostat" issued to Micheal Levine on June 10, 1980. These digital electronic thermostats typically employ a semiconductor switching element to control the application of electric power to a temperature modification apparatus, such as a heating unit or an air conditioning unit. Typically a triac or one or more silicon controlled recitifiers are employed as this semiconductor switching element.

There exists a problem with the use of such semiconductor switching elements. These semiconductor switching elements carry considerable electrical current and can generate a great deal of heat. The generation of heat is incompatable with the measurement of ambient temperature as required by a thermostat. The heat generated by the semiconductor switching element often caused inaccuracies in the temperature measurement. These inaccuracies effect the maintence of a stable temperature in the building or room in question. Thus there is a need for a technique to reduce, eliminate or compensate for the self heating inherent in these digital electronic thermostats.

SUMMARY OF THE INVENTION

The present invention is a technique to compensate for thermostat self heating in digital electronic thermostats. According to the present invention two temperature sensitive elements are employed, one located remotely from the semiconductor switch element and one between the first temperature sensitive element and the semiconductor switching element. In accordance with the preferred embodiment these temperature sensitive elements are thermistors. Thermistors have an electrical resistance which varies with temperature. The technique measures the difference in temperature between these two temperature sensitive elements and makes correction in the ambient temperature measurement made by the first temperature sensitive element based upon the magnitude of this difference.

In accordance with the preferred embodiment of the present invention the technique corrects the measurement of ambient temperature according to the following formula:

$$T_C = T_{T1} - K^*(T_{T2} - T_{T1})$$

where $T_C$ is the corrected ambient temperature, $T_{T1}$ is the temperature measured by the first temperature sensitive element, $T_{T2}$ is the temperature measured by the second temperature sensitive element and K is an externally specified constant. The constant K determines the percentage of the difference between the temperature measured by the second temperature sensitive element and the temperature measured by the first temperature sensitive element which is subtracted from the temperature measured by the first temperature sensitive element.

In accordance with the preferred embodiment a microprocessor is employed to control the measurement process, compute the ambient temperature correction and to perform the desired control function. The magnitude of the constant K is specified by an external fixed resistor. It is contemplated that the constant K will vary for each model of thermostat. The particular needed constant K will be determined from actual measurements on a prototype of the thermostat and then an appropriate reisitor to specify this constant will be connected in the production models.

BRIEF DESCRIPTION OF THE DRAWINGS

These and other aspects of the present invention will become clear from study of the drawings in which.

DETAILED DESCRIPTION OF THE PREFERRED EMBODIMENT

Figure 1:
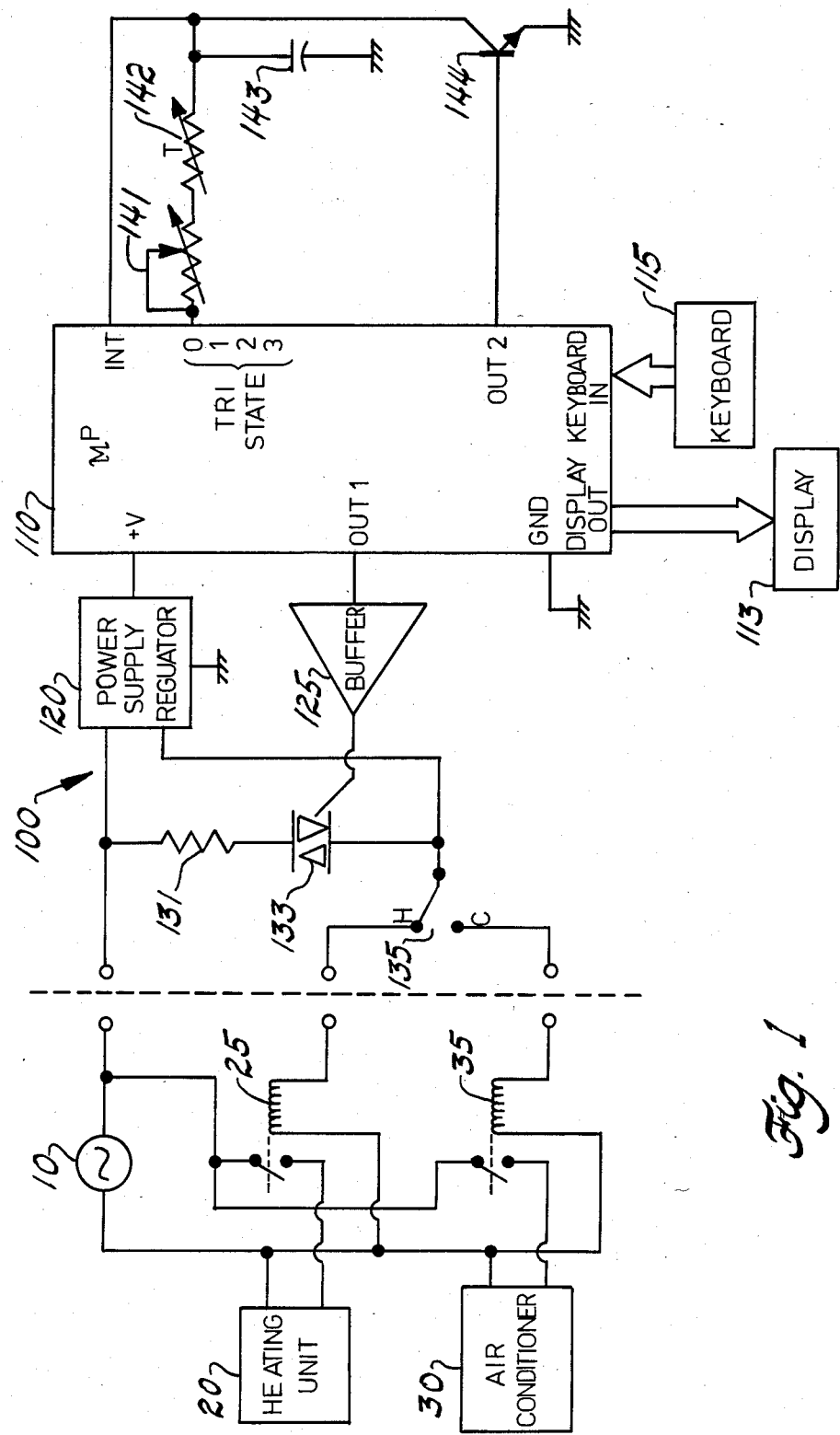
FIG. 1 illustrates an example of an electronic thermostat employing a microprocessor in accordance with the prior art.

FIG. 1 illustrates the typical construction of an electronic programmable thermostat in accordance with the prior art. Electronic programmable thermostat 100 includes microprocessor unit 110 which is coupled to display 113 and keyboard 115, power supply regulator 120, a buffer 125 which drives a triac 133, a series resistor line, a heat/cool mode switch 135 and a temperature sensing circuit including variable resistor 141, thermistor 142, capacitor 143 and transistor 144. Electronic thermostat 100 is connected to a combined heating and air conditioning plant including AC power supply 10, heating unit 20 with an associated relay 25 and air conditioner 30 with associated relay 35.

Electronic thermostat 100 is programmed via keyboard 115 to store a sequence of desired temperatures at desired times. The ambient temperature of the thermostat is measured via thermistor 142. The resistance of thermistor 142 is measured by measuring the time constant of the RC circuit including variable resistor 141, thermistor 142 and capacitor 143. In accordance with the relationship with the measured temperature to the desired temperature, microprocessor unit 110 generates an output at output 1 to buffer 125 which controls whether triac 133 is triggered ON or not. If triac 133 is triggered ON then one of the relays 25 or 35 is supplied with electric power from AC source 10 depending upon the state of heat/cool mode switch 135. The actuated relay in turn operates the corresponding heating unit 20 or air conditioner 30.

Power supply regulator 120 is connected to receive power from the series connection of resistor 131 and triac 133. This power comes from AC power source 10. In the event that triac 133 is not triggered ON, then the full voltage of the AC power source 10 appears across the input to power supply regulator 120. If, on the other hand, triac 133 is triggered ON, then the voltage input to power supply regulator 120 is the voltage across triac 133 together with the IR voltage appearing across resistor 131. As a result, the input voltage applied to power supply regulator 120 varies widely depending on whether or not triac 133 is triggered ON. Therefore, power supply regulator 120 is employed to smooth these wide variations in supply voltage to derive the appropriate voltage for driving the microprocessor unit 110.

The ambient temperature is measured by the microprocessor unit 110 from the variable resistor 141, thermistor 142, capacitor 143 and transistor 144. Variable resistor 141 and thermistor 142 together with capacitor 143 form a RC time constant circuit. The resistance of thermistor 142 varies as a function of ambient temperature. This resistance is measured by measuring the time constant of this RC circuit. Microprocessor unit 110 includes a plurality of tristate output lines 0–3. One of these tristate output lines is applied to one end of the RC time constant circuit, while the other end of this RC time constant circuit is connected to ground.

These tristate output lines of microprocessor unit 110 have unique characteristics. The output of each of these tristate output lines can be driven to the power supply voltage in response to a "1" output or to the ground voltage in response to a "0" output. In this state the output line is connected through a relatively small resistance of 50 to 100 ohms to the respective voltage source. It is also possible to drive any of these tristate output lines to an indeterminate state in which the output line is connected to neither the positive supply voltage or ground. Typically, the isolation between the output and either the power supply voltage or ground is greater than 5 megaohms when in the indeterminate state.

Transistor 144 is connected across capacitor 143. Transistor 144 has its base connected to output 2 of the microprocessor unit 110. Transistor 144 is employed to discharge any charge which is stored on capacitor 143. In response to a "1" output on ouput 2 from microprocessor unit 110, transistor 144 is biased ON and discharges any charge stored in capacitor 143. In response to a "0" output at output 2 of microprocessor unit 110, transistor 144 is biased OFF and does not effect the charge on capacitor 143.

Lastly, the output voltage across capacitor 143 is connected to an interrupt input of microprocessor unit 110. This interrupt input is employed to signal microprocessor unit 110 that the voltage across capacitor 143 has exceeded this predetermined value.

During operation of electronic thermostat 100, the temperature indicated by thermistor 142 is measured employing a program stored within microprocessor unit 110 to control the output supplied to this measurement circuit. Firstly, transistor 144 is biased ON in order to discharge any charge stored in capacitor 143. During this operation the tristate output 0 could be held at either the indeterminate state or at ground through the output of a digital "0". After transistor 144 has been biased ON for a sufficient period to substantially discharge capacitor 143, output 2 supplied to the base of transistor 144 is changed to bias this transistor to OFF.

The time constant of the RC circuit is then measured. The tristate output line 0 is driven to the power supply voltage via the output of a digital "1". At the same time a timer circuit is initialized and begins to accumulate the elapsed time. This output from the tristate output line 0 causes the power supply voltage to be applied across variable resistor 141, thermistor 142 and capacitor 143. As a consequence, a current flows through this RC circuit and begins accumulate charge within capacitor 143. This accumulating charge within capacitor 143 causes the voltage thereacross to increase. This voltage is sensed by the interrupt input INT of microprocessor unit 110. When the voltage across capacitor 143 exceeds the predetermined threshold of interrupt input INT, this input is triggered. Microprocessor unit 110 is programmed to stop the elapsed time clock at this time. As a consequence, the time then indicated by the elapsed time clock is a measure of the time constant of the RC circuit. Ideally, the only variable in this time constant measurement is the resistance of thermistor 142. Therefore, this measured elapsed time is a measure of the temperature sensed by thermistor 142. Typically, microprocessor unit 110 includes a look-up table to convert this time to the corresponding temperature.

There are several disadvantages with the foregoing manner for sensing the temperature. Typically, the resistance of the thermistor is not the only variable in the system. In particular, the capacitance of capacitor 143 may change slowly with time. For this reason, variable resistor 141 has been included in the RC time constant circuit in order to adjust for these factors. Variable resistor 141 may be eliminated if a high precision thermistor 142 and a high precision capacitor 143 are employed. However, the magnitude of the supply voltage is an additional variable. As explained above, the supply voltage applied to microprocessor unit 110 is typically not very well regulated. Therefore, the voltage used to charge capacitor 143 through variable resistor 141 and thermistor 142 can vary depending upon the state of triac 133. This variation in supply voltage causes a variation in the time required to charge capacitor 143 to the predetermined voltage. These variations in the supply voltae can cause inaccuracies in the measured temperature.

As a result of these factors, the designer in accordance with the prior art could make one of two relatively disadvantageous choices. Firstly, a highly complex power supply regulator 120 which provides an excellent regulation of the power supply to microprocessor unit 110 could be employed together with a high precision thermistor 142 and a high precision capacitor 143. A design of this type would serve to eliminate many of the sources of inaccuracy in the measurement of a temperature in accordance with the above described circuit. On the other hand, this provision for a highly accurate power supply regulator 120 and precision components would require additional expense in the construction of the electronic thermostat. On the other hand, a relatively low accuracy power supply regulator 120 could be employed with relatively inexpensive but less precise components. This design technique reduces the cost of electronic thermostat 110 with a consequent decrease in the accuracy of the temperature measurement and thus the accuracy of the control of temperature.

The prior art thermostat illustrated in FIG. 1 has a problem regarding the self-heating of the temperature sensing thermistor by the triac employed for switching the electric power. As triac 133 carries the current for actuation of either relay 25 or relay 35, the current through this element heats it up. In many cases electronic thermostat 100 is unstable because the heating of the triac 133 causes thermistor 142 to be warmed. Even if instability is avoided, this self-heating causes inaccurate measurement of the temperature, and therefore inaccurate thermostatic control.

Control of the self-heating from the triac includes several problems. Firstly, the triac heats only when it is on. Therefore, greater amounts of heat is generated when operating at a higher duty cycle. Such a higher duty cycle occurs when there is a greater heating load or a greater cooling load therefore requiring the selected heating unit 20 or air conditioner 30 to be energized as greater percentage of the time. This type of self-heating can cause wide variations in temperature during the operation of air conditioning. In particular, if the air conditioner is actuated and the triac causes self-heating of the thermistor, the air conditioner may lock on or be on for extended periods of time trying to overcome self-heating before turning off and then be off for an extended period of time for the temperature to return to the set point.

Secondly, although the voltage across the triac is fixed by the physics of this semiconductor device, the current through this device is not known. The amount of current drawn by the relay circuit controls the amount of current taken by the triac. In typical installations this current can vary from between 100 milliamperes and 1 ampere, a ratio of a factor of 10. In particular if an electronic thermostat is intended for retrofit use with an existing heating and air conditioning plant, it is impossible to estimate the amount of self-heating by the triac due to these variations in the current drawn by the relay.

Lastly, the air flow along the wall at which the electronic thermostat is mounted can cause additional problems. In order to minimize self-heating by the triac, the triac is typically mounted at the upper portion of a vertically oriented circuit board with the thermistor disposed on a lower portion of the circuit board. This is an attempt to prevent air heated by the triac from warming and self-heating the thermistor. However, it is generally impossible to determine the direction of air flow along the wall to which the electronic thermostat is mounted. In many installations, the air flow is either upward or transverse and therefore air heated by the triac does not severely heat the thermistor. In other installations the air flow may be downward causing the hot air from the triac to warm the thermistor. Typical instructions for retrofit electronic thermostats suggest moving the location of the thermostat if such problems are encountered. However, in retrofit installations this type of solution is impractical.

Figure 2:
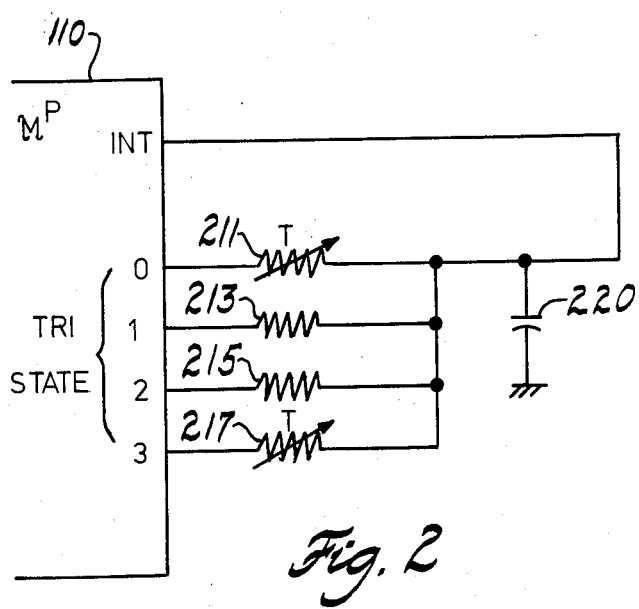
FIG. 2 illustrates connections to the microprocessor for reading and correcting the temperature from a pair of thermistors.

FIG. 2 illustrates a circuit for use with a microprocessor based electronic thermostat such as illustrated in FIG. 1 which can correct for the self heating caused by the triac switching element. FIG. 2 illustrates a RC time circuit including a plurality of resistances and a single capacitance, capacitor 220. Thermistor 211 is connected between the tristate output line 0 of microprocessor device 110 and capacitor 220. Similarly, a high precision fixed resistor 213 is connected between tristate output line 1 and the capacitor. Further, a second high precision fixed resistor 215 is connected between tristate output line 2 and capacitor 220. Lastly, a second thermistor 217 is connected between tristate output line 3 and capacitor 220. Each of these resistive elements forms a RC time constant circuit with the capacitor 220 when actuated by the respective tristate output lines 0-3. Although a discharge circuit such as transistor 144 is not illustrated in FIG. 2, it would be understood by those skilled in the art that such a discharge circuit could be employed.

Measurement of the resistance of thermistor 211 occurs in a manner similar to that described above in conjunction with the description of FIG. 1. Capacitor 220 is discharged. This could occur through a discharge device such as transistor 144 illustrated in FIG. 1, or it could occur by tying all of the tristate output lines 0-3 to the ground potential by applying a "0" output to these lines. This latter technique is believed advantageous because it reduces the need for components external to the microprocessor unit 110. Once the capacitor 220 has been sufficiently discharged, an indeterminate high impedance output is applied to tristate output lines 1-3. At the same time, a "1" output is applied to tristate output line 0. An elapsed timer is started in a manner similar to that described above. When the voltage across capacitor 220 reaches the predetermined threshold voltage of the interrupt input INT of microprocessor unit 110, then the elapsed time on the elapsed time counter corresponds to the resistance of thermistor 211. This in turn corresponds to the temperature at thermistor 211.

After this measurement has been made then a second measurement is made. Firstly, capacitor 220 is discharged in a manner similar to that described above. Then capacitor 220 is charged via precision fixed resistor 213. This is achieved by applying an indeterminate high impedance output to tristate output lines 0, 2 and 3 and by applying a digital "1" output to tristate line 1. This applies the power supply voltage across the AC circuit including precision fixed resistor 213 and capacitor 220. In the same manner as previously described, the elapsed time is measured from the first application of voltage across capacitor 220 until the voltage across capacitor 220 exceeds the predetermined threshold of the interrupt input INT. This elapsed time is a measure of the resistance of precision fixed resistor 213.

In accordance with the preferred embodiment, the resistance selected for the precision fixed resistor 213 is approximately equal to the nominal value of the resistance of thermistor 211 at a selected reference temperature, such as 70° F. The arithmetic computational capability of the microprocessor 110 is then used to compute the ratio of the time constant measured through thermistor 211 and the time constant measured through precision resistor 213. This ratio of times gives an indication of the ratio of the resistance of thermistor 211 to the resistance of precision fixed resistor 213. The computation of this ratio has the advantageous effect of eliminating sources of variability. The value of capacitance 220 is the same for each measurement. In addition, if these time constant measurements take place sequentially, the power supply voltage of microprocessor 110 cannot change greatly during this interval. Thus the formation of this ratio serves to eliminate many of the sources of inaccuracy of the measurement of the resistance of thermistor 211. This serves to permit a more precise measure of the temperature.

Figure 3:
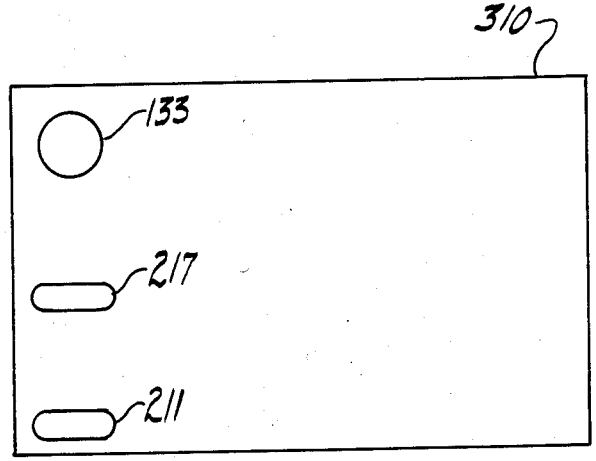
FIG. 3 illustrates the preferred mounting of the triac and the first and second thermistors on a printed circuit board in accordance with the present invention.

FIG. 3 illustrates the manner of mounting triac 133, first thermistor 211 and a second thermistor 217. Triac 133 is mounted on printed circuit board 310 at an upper portion thereof. In accordance with the typical installation, printed circuit board 310 is vertically mounted parallel to the wall upon which the electronic thermostat is mounted. Triac 133 is preferably mounted at an upper portion thereof in order to reduce the heating of first thermistor 211 via hot air from triac 133. Thermistor 211 is preferably mounted at a lower portion of the printed circuit board 310. The second thermistor 217 is mounted on printed circuit board 310 at a position intermediate between triac 133 is first thermistor 211.

FIG. 2 also illustrates fixed resistor 215 and second thermistor 217. In a manner that will be further described below, the temperature measured by second thermistor 217 is employed to correct for the effect of the heating of triac 133 upon the first thermistor 211. In general the greater the difference between the temperature measured by these two thermistors the greater the correction. The temperature measured by second thermistor is determined in a manner similar to the method used with regard to first thermistor 211. In addition the resistance of the fixed resistor 215 is measured by measuring the time constant of this resistor and the capacitor 220. This takes place in a manner similar to the measurement of the resistance of precision fixed resistor 213. The ratio of the resistances of fixed resistor 215 and precision fixed resistor 213 is employed in the measured temperature correction computation. This will be more fully explained below.

Figure 4A:
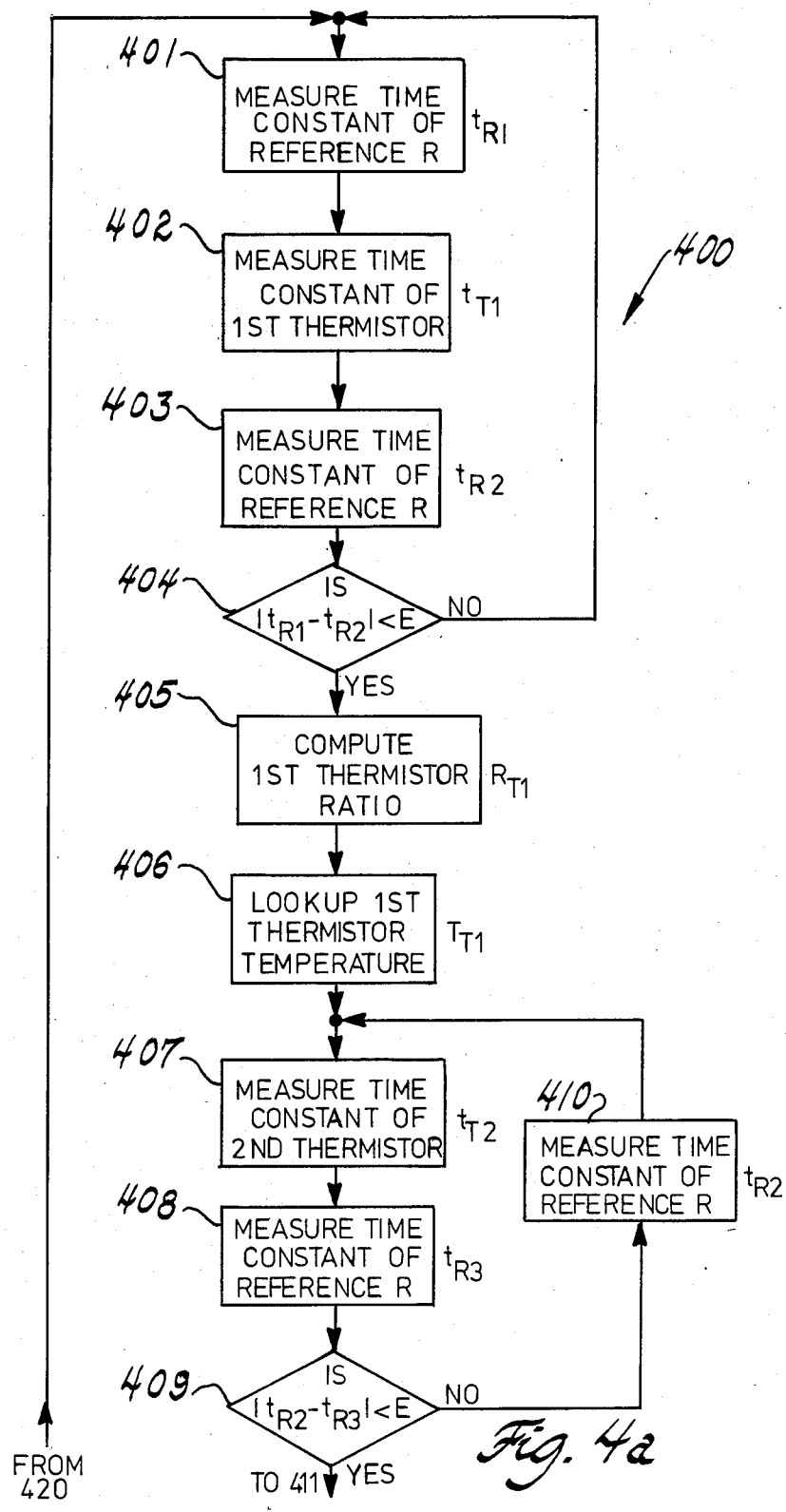
FIGS. 4a, 4b, 4c illustrate flow charts of the self heating correction electronic thermostat employing the circuitry illustrated in FIG. 2.
Figure 4B:
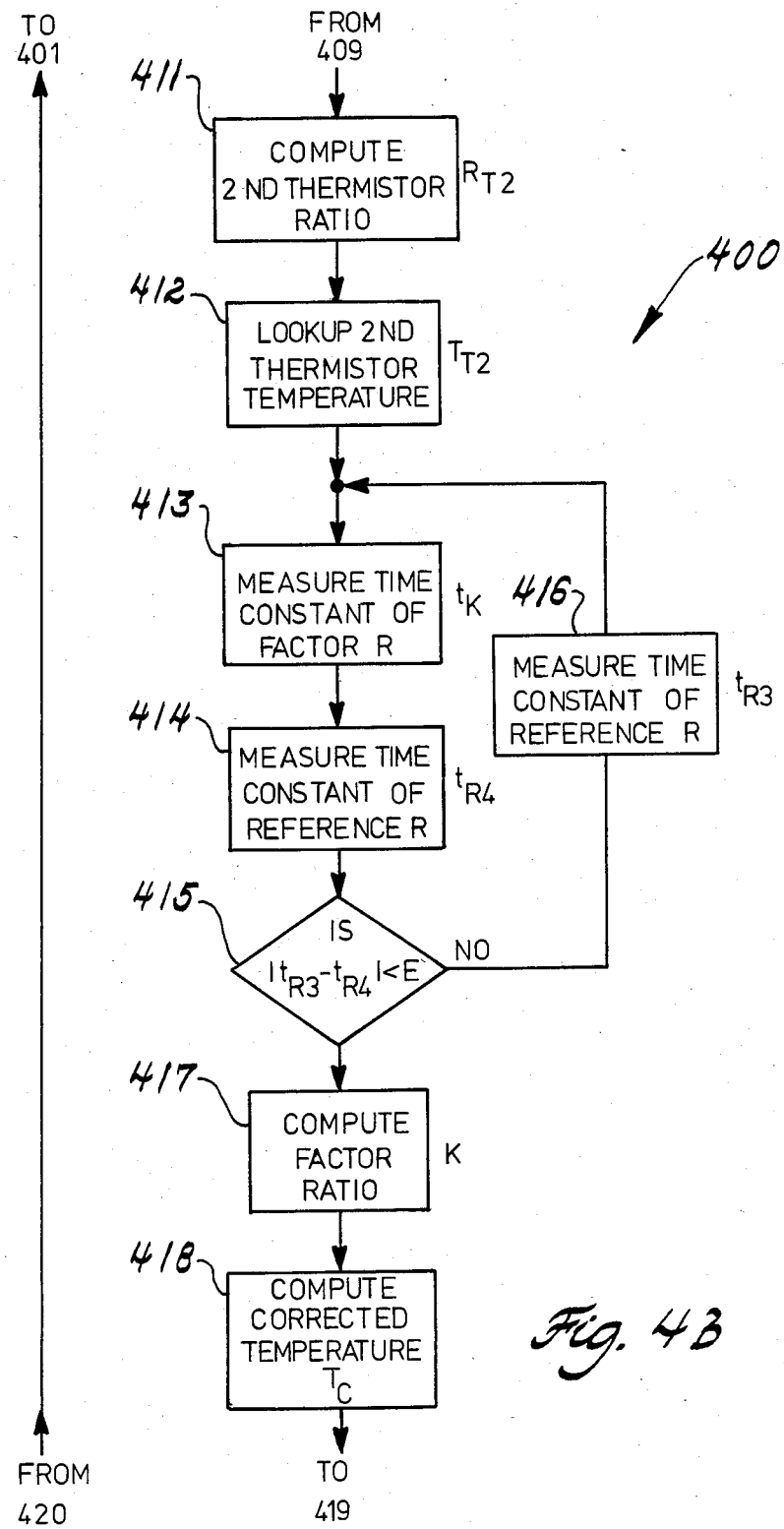
Figure 4C:
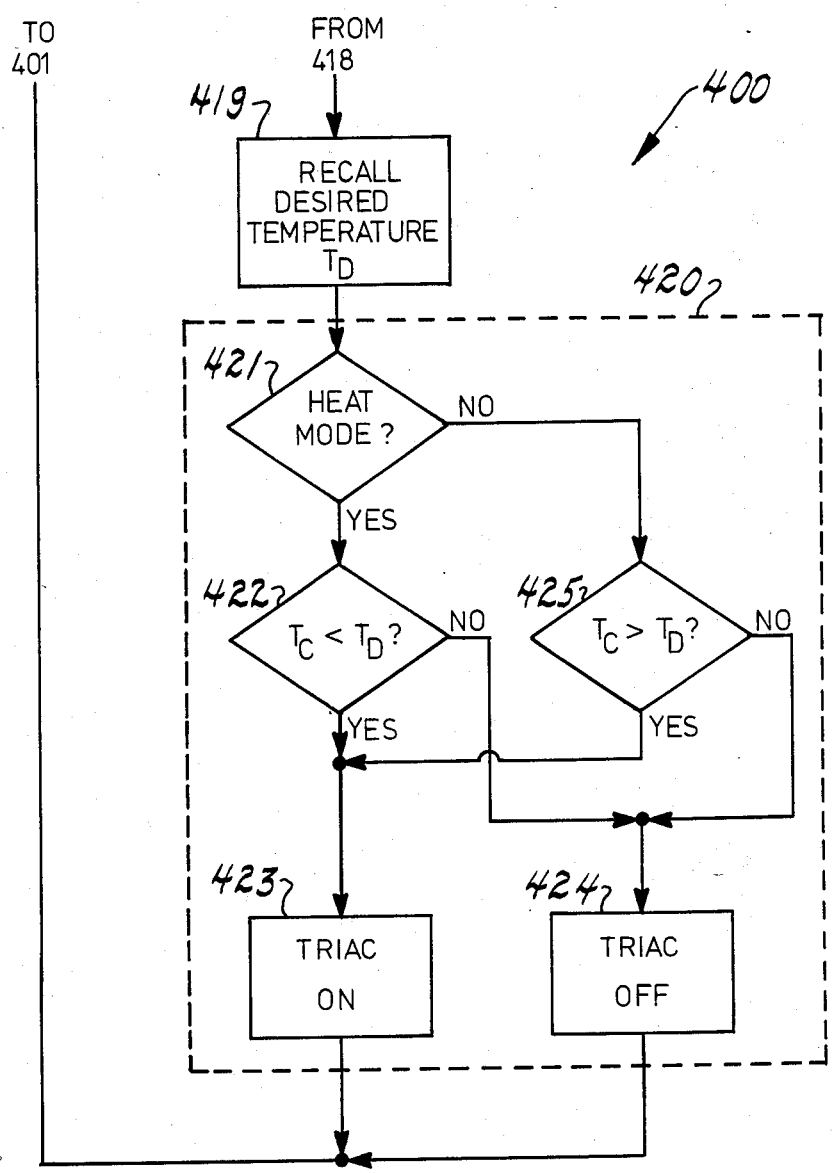

FIG. 4 illustrates program 400 for providing the self-heating correction in accordance with the circuits illustrated in FIG. 3. Program 400 is a continuous loop which repeatedly measures the temperature, corrects the measured temperature and provides the necessary control based upon the relationship between the desired temperature and the measured temperature.

The description of program 400 will begin with processing block 401 which measures the time constant through precision fixed resistor 213. This measure of the time constant takes place in accordance with subroutine 500 illustrated in FIG. 5. Program 400 next measures the time constant through the first thermistor 211. Then program 400 again measures the time constant through precision fixed resistor 213 (processing block 403).

Program 400 then tests to determine if the two measurements of the time constant of the precision fixed resistor 213 are within a predetermined error limit E. This is accomplished by taking the absolute value of the difference between the first measurement of the time constant $t_{R1}$ and the second measurement of the time constant $t_{R2}$. If this absolute value is less than the error limit E, then the two measurements are within the predetermined error limit. This test insures that the measurement conditions have not changed significantly during the measurement process. If the two measurements are not within the predetermined error limit, then control of Program 300 passes to processing block 401 to repeat the measurement sequence. Program 400 remains in this loop until the measurements are within the predetermined error limit E.

Program 400 measures the ratio for the first thermistor in accordance with the following formula:

$$R_{T1} = t_{T1}/t_{R1}$$

where $R_{T1}$ is the ratio for the first thermistor, $t_{T1}$ is the time constant for the first thermistor, and $t_{R1}$ is the first measured time constant of the precision fixed resistor 213 (processing block 405). Program 400 then performs a table look-up to determine the temperature $T_{T1}$ measured by the first thermistor (processing block 406).

Program 400 then measures the time constant $t_{T2}$ of the second thermistor 217 (processing block 407). Program 400 measures the time constant through precision fixed resistor 213 for the third time (processing block 408). Program 400 then makes a test similar to that indicated above in relation to the measurement of the time constant of the first thermistor 211. Program 400 tests to determine if the absolute value of the difference between the second measured time constant of the precision fixed resistor $t_{R2}$ and the third measured time constant of the precision fixed resistor $t_{R3}$ is less than a predetermined error limit E (decision block 409). If it is not, then the second measurement of the time constant of precision fixed resistor 213 is repeated (processing block 410) and control passes to processing block 407 to repeat the measurement process. As previously described, Program 400 remains in this loop until the measurement is complete.

The ratio for the second thermistor is then computed (processing block 411). This is performed employing the formula:

$$R_{T2} = t_{T2}/t_{R2}$$

where $R_{T2}$ is the ratio for the second thermistor, $t_{T2}$ is the time constant for the second thermistor, and $t_{R2}$ is the second measured time constant of the precision fixed resistor 213. This ratio value is employed with a look up table in order to determine the temperature $T_{T2}$ measured by the second thermistor (processing block 412).

Program 400 then measures the time constant $t_k$ through constant specifying resistor 215 (processing block 413). As will be explained in further detail below, this resistor is employed to input a constant into microprocessor unit 110. The time constant through precision fixed resistor 213 is measured for the fourth time (processing block 414). Program 400 then makes a test similar to that indicated above in relation to the measurement of the time constant of the thermistor. Program 400 tests to determine if the absolute value of the difference between the third measured time constant $t_{R3}$ of the precision fixed resistor 213 and the fourth measured time constant $t_{R4}$ of the precision fixed resistor 213 is less than a predetermined error limit E (decision block 415). If it is not, then the third time constant $t_{R3}$ of precision fixed resistor 213 is again measured (processing block 416) and control passes to processing block 413 to repeat the measurement process. As previously described, Program 400 remains in this loop until the measurement is complete.

Program 400 then computes a ratio for the fixed resistor 210. This is computed using the following formula:

$$K = t_K/t_{R3}$$

where K is the factor to be computed, $t_K$ is the original measured time constant for fixed resistor 215, and $t_{R3}$ is the third measured time constant of the precision fixed resistor 213 (processing block 417). This factor K is employed in the formula for computation of the corrected temperature. Thus, the value of precision resistor 215 is employed to specify the constant K.

Program 400 then computes the corrected measured temperature $T_C$ (processing block 418). This is computed in accordance with the following formula:

$$T_C = T_{T1} - K^*(T_{T2} - T_{T1})$$

The constant K determines the percentage of the difference between the temperature measured by the second thermistor and the temperature measured by the first thermistor that is subtracted from the temperature measured by the first thermistor. In the construction illustrated in FIG. 3, it is expected that generally the temperature measured by the second thermistor 217 will be greater than that measured by the first thermistor 211 because the second thermistor 217 is closer to triac 133 which is a source of heat. The greater the difference in temperature in that measured by the two thermistors, the greater the temperature gradient near the thermistor and the greater the correction factor necessary to correct for the true ambient temperature in the absence of self heating. In the event that the difference in temperature between the temperatures measured by the two thermistors is zero or very small, then the temperature measured by first thermistor 211 is an accurate reflection of the ambient temperature and a small or zero correction factor is indicated.

In general, a less precise second thermistor 217 may be employed in this application. That is, it is not necessary for the temperature versus resistance curve of the second thermistor to be as precisely known prior to installation. The offset between the first and second thermistors can be measured when the triac 133 has been off for a long period of time, insuring that there is no self-heating. This correction factor can be added to the temperature determined by the look-up table (processing block 412) in order to arrive at the temperature at the second thermistor.

The reason why the constant K is specified by resistor 215 rather than being specified by the program of microprocessor unit 110 is as follows. It is believed that the optimum value of K employed in the temperature correction formula above is critically dependent upon the mechanical design of the thermostat. It is proposed that the completed mechanical design of a particular thermostat be tested in an environmental chamber to empirically determine the optimum value of the constant K. If the constant K were stored in the program of microprocessor device 110, then the microprocessor design cannot be complete until the mechanical design is completed and this empirical determination of the constant K is made. By using resistor 215 to specify the constant K, the design of microprocessor unit 110 is not dependent upon the completion of the mechanical design and empirical testing. The specification of constant K takes place by selection of the resistance of resistor 215 independent of the microprocessor program. In addition, the same type of microprocessor unit 110 can be employed in differing mechanical designs with resistor 215 selected according to the optimum constant K for that particular design. Thus, only one type of microprocessor need be manufactured and stocked, decreasing the manufacturing cost of the thermostat.

Program 400 then recalls the desired temperature $T_D$ (processing block 419). In accordance with the preferred embodiment, this desired temperature is recalled from a sequence of desired temperatures for particular times stored within microprocessor unit 110. The manner of storage of these desired temperatures is in accordance with the prior art and will not be further discussed. This recalled desired temperature $T_D$ is employed in the thermostatic control function described below.

Program 400 then performs the thermostatic control function (subroutine 420). As shown in subroutine 420 the program performs a simple on/off function based upon the relationship of the measured ambient temperature $T_C$ and the desired temperature $T_D$. Those skilled in the art would realize that other thermostatic control functions are feasible.

Subroutine 420 begins by testing whether the thermostat is in heating mode (decision block 421). If this is the case then subroutine 420 tests to determine if the corrected measured temperature $T_C$ is less than the desired temperature $T_D$. If the corrected measured temperature $T_C$ is less than the desired temperature $T_D$ then triac 133 is triggered ON (processing block 424), otherwise triac 133 is OFF (processing block 424). In the event that the thermostat is not in heating mode, it is in cooling mode. Subroutine 420 tests to determine if the corrected measured temperature $T_C$ is greater than the desired temperature $T_D$ (decision block 425). If this is the case, then triac 133 is triggered ON (processing block 423). Otherwise triac 133 is OFF (decision block 424). In any event control of program 400 returns to processing block 401 to repeat the measurement and control process.

Figure 5:
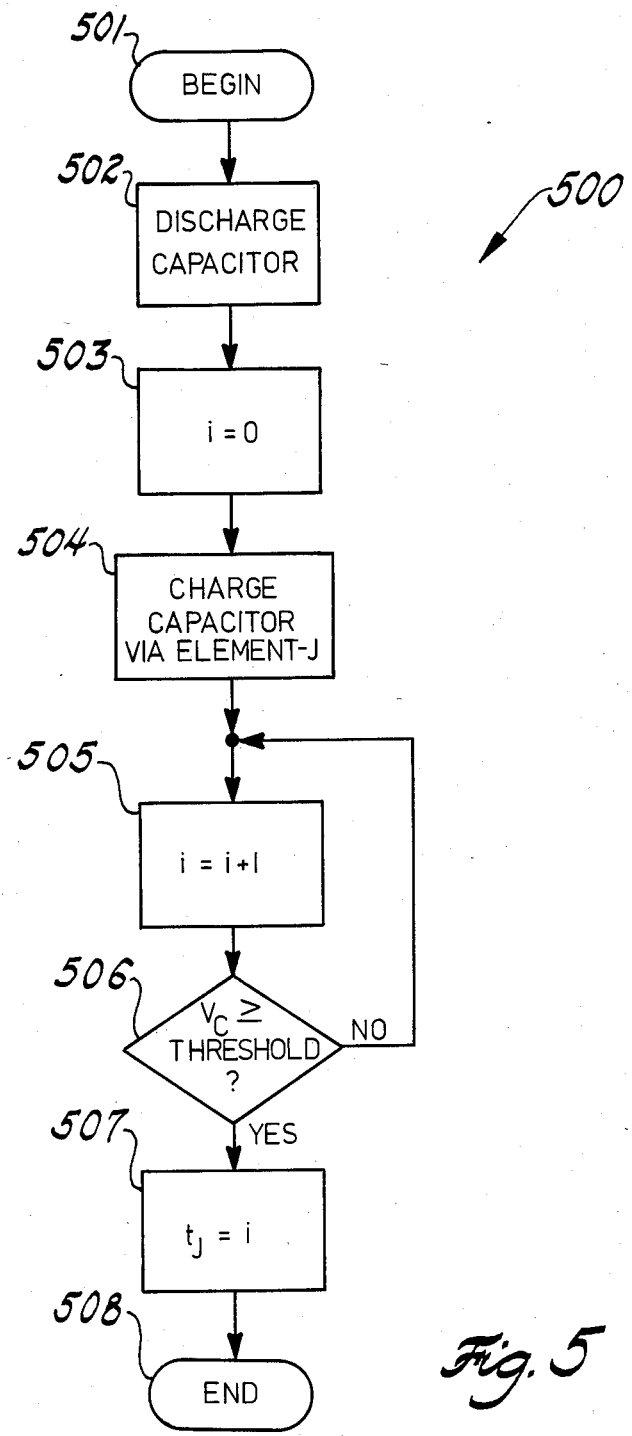
FIG. 5 illustrates an example of the subroutine for measuring the time constant of an RC circuit connected in the manner illustrated in FIG. 2.

Program 500 illustrated in FIG. 5 is a flow chart of the manner in which the time constants are measured in program 300. Subroutine 500 is employed to embody processing blocks 401, 402, 403, 407, 408, 410, 413, 414 and 416 illustrated in FIG. 4. Subroutine 500 is begun at start block 501. Subroutine 500 first discharges capacitor 220 (processing block 502). This could take place with the use of an external device such as transistor 144 illustrated in FIG. 1 or via the tristate output lines 0–3. Next, an index variable i is initialized (processing block 503). The capacitor 200 is then charged via the particular element J (processing block 504) by actuation of the proper tristate output line 0–3. Subroutine 500 then increments the index variable i (processing block 505). Next, subroutine 500 tests to determine whether or not the voltage across capacitor 220 $V_C$ is greater than or equal to the threshold voltage (decision block 506). If this is not the case then the measurement is not complete and subroutine 500 returns to processing block 505. If this is the case then the measurement is complete. The measured time for the element J $t_J$ is set equal to the index variable i (processing block 507). Subroutine 500 is then complete and is exited via end block 508.

In a practical embodiment of subroutine 500, the incrementing step 505 would be performed by adding 1 to a memory register within microprocessor unit 110. The processing of determining whether or not the voltage across the capacitor $V_C$ exceeds the predetermined threshold of decision block 506 can be employed via the interrupt input of INT microprocessor device 110. Thus for example the incrementing of the index variable i can occur within a closed loop and this loop be broken only at the receipt of the interrupt. The interrupt is detected when the voltage across the capacitor exceeds the predetermined threshold of the interrupt input INT. This interrupt signal stops the incrementing of the index variable i and causes this value to be stored as the measured time. Thus the clock which controls the rate of operation of the microprocessor device 110 serves as a timer to time the number of increments of the index variable i.

We claim:

1. An electronic thermostat having a correction for self heating comprising:
   a circuit board for supporting and interconnecting electrical parts of the electronic thermostat;
   a semiconductor power switching device disposed on said circuit board, controlled for selective connection of electric power to a temperature control unit;
   a first temperature sensor disposed on said circuit board at a location remote from said semiconductor power switching device, having an electrical characteristic which varies with ambient temperature;
   a second temperature sensor disposed on said circuit board at a location intermediate between said semiconductor power switching device and said first temperature sensor, having an electrical charactersistic which varies with ambient temperature;
   a temperature correction means connected to said first and second temperature sensors for generating a corrected temperature signal from the temperature indicated by the electrical charactersistic of said first temperature sensor and the temperature indicated by the electrical charactersistic of said second temperature sensor;
   a desired temperature means for generating a desired temperature signal indicative of a desired temperature;
   a control unit connected to said semiconductor power switching device, said temperature correction means and said desired temperature means for controlling the state of said semiconductor power switching device based upon the relationship of the corrected temperature signal and said desired temperature signal.

2. The electronic thermostat as claimed in claim 1, wherein:
   said semiconductor power switching device is a triac.

3. The electronic thermostat as claimed in claim 1, wherein:
   said first and second temperature sensors are thermistors and said electrical charactersitic which varies with ambient temperature is resistance.

4. The electronic thermostat as claimed in claim 1, wherein:
   said temperature correction means generates said corrected temperature from the formula:

$$T_C = T_{T1} - K^*(T_{T2} - T_{T1})$$

where $T_C$ is the corrected temperature, $T_{T1}$ is the temperature measured by said first temperature sensor, $T_{T2}$ is the temperature measured by said second temperature sensor, and K is a predetermined constant.

5. The electronic thermostat as claimed in claim 4, further comprising:
   a constant specification means for specification of said predetermined constant K.

6. An electronic thermostat having a correction for self heating comprising:
   a semiconductor power switching device controlled for selective connection of electric power to a temperature control unit;
   a first thermistor disposed at a location remote from said semiconductor power switching device, having a resistance which varies with ambient temperature;
   a second thermistor disposed at a location intermediate between said semiconductor power switching device and said first thermistor, having a resistance which varies with ambient temperature;
   a microprocessor unit connected to said semiconductor power switching device, said first thermistor and said second thermistor, said microprocessor device including
      a first temperature measurment means connected to said first thermistor for determining the first temperature indicated by the resistance of said first thermistor,
      a second temperature measurment means connected to said second thermistor for determining the second temperature indicated by the resistance of said second thermistor,
      a temperature correction means connected to said first and second temperature measurement means for generating a corrected temperature signal from said first temperature and said second temperature,
      a desired temperature means for generating a desired temperature signal indicative of a desired temperature,
      a control unit connected to said semiconductor power switching device, said temperature correction means and said desired temperature means for controlling the state of said semiconductor power switching device based upon the relationship of the corrected temperature signal and said desired temperature signal.

7. The electronic thermostat as claimed in claim 6, wherein:
   said semiconductor power switching device is a triac.

8. The electronic thermostat as claimed in claim 6, wherein:
   said temperature correction means generates said corrected temperature from the formula:

$$T_C = T_{T1} - K^*(T_{T2} - T_{T1})$$

where $T_C$ is the corrected temperature, $T_{T1}$ is said first temperature, $T_{T2}$ is said second temperature, and K is a predetermined constant.

9. The electronic thermostat as claimed in claim 8, further comprising:
   a constant specification means connected to said microprocessor unit having an electrical characteristic corresponding to said predetermined constant K; and
   said microprocessor unit further includes constant K determining means connected to said constant specification means for determining the constant K indicated by said electrical characteristic of said constant specification means, for measuring said electrical characteristic of said constant specification means.

10. The electronic thermostat as claimed in claim 9, further comprising:
    said constant specification means is a fixed resistor; and
    said constant K determining means of said microprocessor unit includes means to determine the resistance of said fixed resistor.

* * * * *